(12) United States Patent  (10) Patent No.: US 7,221,125 B2
Ding  (45) Date of Patent: May 22, 2007

(54) SYSTEM AND METHOD FOR CHARGING A BATTERY (75) Inventor: Yi Ding, Canton, MI (US)

(73) Assignee: Y. Ding, Canton, MI (US)

( * ) Notice: Subject to any disclaimer, the term of this patent is extended or adjusted under 35 U.S.C. 154(b) by 338 days.

(21) Appl. No.: 10/702,813

(22) Filed: Nov. 6, 2003

(65) Prior Publication Data

US 2005/0099162 A1 May 12, 2005

(51) Int. Cl.
H02J 7/04 (2006.01)
(52) U.S. Cl. ..................................... 320/139
(58) Field of Classification Search ................ 320/139
See application file for complete search history.

(56) References Cited

U.S. PATENT DOCUMENTS

| 3,597,673 | A | | 8/1971 | Burkett et al. |
|---|---|---|---|---|
| 3,609,503 | A | | 9/1971 | Burkett et al. |
| 3,614,582 | A | | 10/1971 | Burkett et al. |
| 3,622,857 | A | | 11/1971 | Sethi |
| 3,816,806 | A | | 6/1974 | Mas |
| 4,065,715 | A | * | 12/1977 | Jaffe et al. ................ 324/678 |
| 4,385,269 | A | * | 5/1983 | Aspinwall et al. .......... 320/129 |
| 4,458,194 | A | | 7/1984 | Geppert et al. ............. 318/811 |
| 4,491,768 | A | * | 1/1985 | Slicker ........................ 318/139 |
| 4,829,225 | A | | 5/1989 | Podrazhansky et al. |
| 5,099,186 | A | | 3/1992 | Rippel et al. |
| 5,119,011 | A | | 6/1992 | Lambert |
| 5,179,335 | A | | 1/1993 | Nor |
| 5,307,000 | A | | 4/1994 | Podrazhansky et al. |
| 5,341,075 | A | | 8/1994 | Cocconi |
| 5,432,420 | A | | 7/1995 | Bahn |
| 5,433,512 | A | | 7/1995 | Aoki et al. |
| 5,476,310 | A | | 12/1995 | Ohtsu et al. |
| 5,481,174 | A | | 1/1996 | Martin et al. |
| 5,500,583 | A | | 3/1996 | Buckley et al. |
| 5,500,584 | A | | 3/1996 | Shimomoto |
| 5,552,681 | A | | 9/1996 | Suzuki et al. |
| 5,583,406 | A | | 12/1996 | Mutoh et al. |
| 5,608,308 | A | | 3/1997 | Kiuchi et al. |
| 5,625,274 | A | | 4/1997 | Naskali |
| 5,670,861 | A | | 9/1997 | Nor |
| 5,680,031 | A | | 10/1997 | Pavlovic et al. |
| 5,684,383 | A | | 11/1997 | Tsuji et al. |
| 5,694,023 | A | | 12/1997 | Podrazhansky et al. |
| 5,707,115 | A | | 1/1998 | Bodie et al. |
| 5,710,699 | A | | 1/1998 | King et al. |
| 5,712,549 | A | | 1/1998 | Engel |
| 5,726,554 | A | | 3/1998 | Freiman et al. |
| 5,736,834 | A | | 4/1998 | Kuno |
| 5,831,435 | A | | 11/1998 | Troy |
| 5,914,605 | A | | 6/1999 | Bertness |
| 6,094,033 | A | * | 7/2000 | Ding et al. ................ 320/132 |
| 6,172,480 | B1 | * | 1/2001 | Vandelac ..................... 320/125 |
| 6,229,285 | B1 | * | 5/2001 | Ding ........................... 320/132 |
| 6,366,056 | B1 | * | 4/2002 | Podrazhansky et al. ..... 320/141 |
| 6,841,974 | B2 | * | 1/2005 | Dykeman .................... 320/141 |

* cited by examiner

Primary Examiner—Pia Tibbits (57) ABSTRACT

A system and method for charging a battery is provided. The method includes applying an excitation current pulse to the battery to determine the battery type and whether the battery is capable of holding a charge. To charge the battery, a series of current pulses are applied in groups with the average current being reduced for each succeeding group to take advantage of changing battery charge acceptance. When the voltage of the battery matches a predetermined value, application of the current pulse groups is ended. A single current pulse is then applied to complete the battery charge.

14 Claims, 4 Drawing Sheets

SYSTEM AND METHOD FOR CHARGING A BATTERY

BACKGROUND OF THE INVENTION

1. Field of the Invention

The present invention relates to a system and method for charging a battery.

2. Background Art

A wide variety of systems and methods exist for charging batteries. They cover the range from charging small batteries used for electronic devices, to nickel-metal-hydride batteries used to power a traction motor in an electric vehicle. Many battery charging methods include the application of a constant current, constant voltage, a combination thereof. These methods tend to be relatively easy to implement; however, they typically cannot be used to charge a battery very rapidly and efficiently. Recently, a number of rapid battery charging systems and methods have been developed.

One such system and method is described in U.S. Pat. No. 5,500,584 issued to Shimomoto on Mar. 19, 1996. The method described in Shimomoto involves the use of a three stage charging process. The second process is where a "quick charging process" occurs. During the second process, a number of current pulses are applied to the battery. The pulses are defined by the application of a large current, followed by a charging suspension. The pulses are applied until a charge-end voltage is attained. One limitation of charging a battery by this method, is that it does not account for changes in battery charge acceptance throughout the charging process, for example, by reducing the current applied to the battery as the voltage gets closer to the charge-end voltage.

Another method and apparatus for charging batteries is described in U.S. Pat. No. 5,680,031 issued to Pavlovic et al. on Oct. 21, 1997. The method described in Pavlovic et al. uses a series of positive current pulses to charge a battery using a charging cycle made up of three different regions. The average current applied to the battery decreases over the three regions. In order to regulate the charging current, the method of Pavlovic et al. uses a value of a resistance free voltage. The resistance free voltage is not measured directly, but rather, requires two different voltage readings, two different current values, and the application of an equation which utilizes the relationship between the voltages, the currents, and the resistance free voltage.

Therefore, a need exists for a system and method for charging batteries that is capable of varying the charge applied to the battery to take advantage of the change in battery charge acceptance, and is capable of doing so using a single, measured parameter without requiring multiple parameter measurements and the application of an equation based on a relationship between the measured parameters.

SUMMARY OF THE INVENTION

Accordingly, the present invention provides a method for charging a battery. The method includes applying a first positive current pulse to the battery, where the first current pulse is defined by a first pulse amplitude and a first pulse width. A second positive current pulse is applied to the battery after applying the first current pulse. The second current pulse is applied such that the current applied to the battery does not reach zero between the first and second current pulses. The second current pulse is defined by a second pulse amplitude and a second pulse width, where the second pulse amplitude is smaller than the first pulse amplitude. The first and second pulses define a first pulse group. Application of the first pulse group is repeated until a first measured parameter exceeds a predetermined value. A third positive current pulse is applied to the battery, where the third current pulse is defined by a third pulse amplitude and a third pulse width. A fourth positive current pulse is applied to the battery after applying the third current pulse. The fourth current pulse is applied such that the current applied to the battery does not reach zero between the third and fourth current pulses. The fourth current pulse is defined by a fourth pulse amplitude and a fourth pulse width, where the fourth pulse amplitude is smaller than the third pulse amplitude. The third and fourth pulses define a second pulse group. Application of the second pulse group is repeated until a second measured parameter exceeds a predetermined value.

The invention also provides a method for charging a battery, including applying an excitation current pulse to the battery. A voltage response of the battery is measured after the excitation current pulse is applied. A first positive current pulse is applied to the battery, where the first current pulse is defined by a first pulse amplitude and a first pulse width. The first pulse amplitude is based on the measured voltage response or a predetermined value. A second positive current pulse is applied to the battery after the first current pulse is applied. The second current pulse is defined by a second pulse amplitude and a second pulse width, where the second pulse amplitude is smaller than the first pulse amplitude. Application of the first and second positive current pulses is repeated until a measured parameter exceeds a predetermined value.

The invention further provides a method for charging a battery, including applying an excitation current pulse to the battery. A voltage response of the battery is measured after the excitation current pulse is applied. A first voltage pulse is applied to the battery. The first voltage pulse is defined by a first voltage pulse amplitude and a first voltage pulse width. The first voltage pulse amplitude is greater than an open circuit voltage of the battery. A rest period is provided after application of the first voltage pulse. Additional voltage pulses are applied to the battery, separated by corresponding rest periods, until a predetermined condition is met.

The invention also provides a system for charging a battery, including a power source and a controller in communication with the power source. The controller is configured to facilitate application of current pulses to a battery. At least one sensor is configured to measure a corresponding battery parameter and to output signals related to the corresponding parameter. A processor is in communication with the controller and the at least one sensor. The processor is configured to command the controller to apply an excitation current pulse to the battery, thereby facilitating a measurement by the at least one sensor of a voltage response to the battery. The processor is further configured to determine a first positive current pulse defined by a first pulse amplitude and a first pulse width. The first pulse amplitude is based on the measured voltage response or a predetermined value. The processor is also configured to command the controller to apply the first current pulse to the battery, and to command the controller to apply a second positive current pulse to the battery. The second positive current pulse is defined by a second pulse amplitude and a second pulse width, where the second pulse amplitude is smaller than the first pulse amplitude.

The invention further provides a system for charging a battery. The system includes a power source, a controller, and at least one sensor. The controller is in communication with the power source, and it is configured to facilitate application of current pulses and voltage pulses to the battery. The at least one sensor is configured to measure a corresponding battery parameter, and to output signals related to the corresponding parameter. A processor is in communication with the controller and the at least one sensor, and is configured to command the controller to apply an excitation current pulse to the battery, thereby facilitating a measurement by the at least one sensor of a voltage response of the battery. The processor is further configured to determine a first voltage pulse defined by a first voltage pulse amplitude and a first voltage pulse width. The first voltage pulse amplitude is greater than an open circuit voltage of the battery. The processor is also configured to command the controller to provide a rest period after application of the first voltage pulse, and to apply additional voltage pulses to the battery, separated by corresponding rest periods, until a predetermined condition is met.

DETAILED DESCRIPTION OF THE PREFERRED EMBODIMENT(S)

Figure 1:
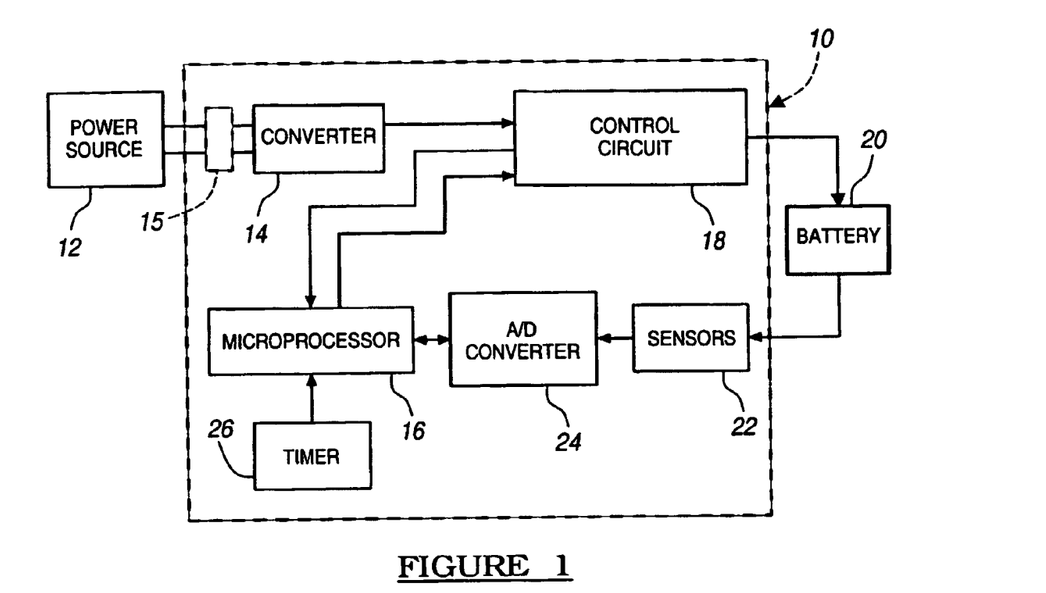
FIG. 1 shows a simple schematic diagram of a battery charger in accordance with the present invention.

FIG. 1 shows a schematic representation of a battery charger 10 in accordance with the present invention. The battery charger 10 is connected to a power source 12, which can provide either alternating current (AC) or direct current (DC). For example, the battery charger 10 may be conveniently plugged into a standard household electrical socket that provides AC power at a nominal 120 volts. Alternatively, the battery charger 10 can be plugged into a higher voltage AC power source, such as a 240 volt power source commonly used in industrial settings. In order to accommodate the use of an AC power source, a converter 14 is provided to convert the AC power to DC power before it is used by the battery charger 10. Alternatively, a DC power source, such as a 12 volt car battery, can be used. In such a case, an adapter 15, shown in phantom, may be used to physically adapt the DC power source to the converter 14. The converter 14 then acts as a transformer to output the correct DC power. Thus, the battery charger 10 can accommodate a variety of different power sources.

A processor, or microprocessor 16, as explained in more detail below, performs a number of control functions for the battery charger 10. Power from the power source 12 is provided to a controller, or control circuit 18. The control circuit 18 is configured to receive power from the converter 14, and to output current or voltage in the form of pulses to a battery 20 that has been placed in the battery charger 10 for charging. The control circuit 18 can also have an integrated converter, instead of a separate unit, as shown in FIG. 1.

In communication with the battery 20 are sensors 22, which may include one or more sensors for measuring a battery parameter, such as battery temperature, voltage, or current. Output from the sensors 22 is sent to an analog-to-digital (A/D) converter 24. The A/D converter 24 communicates with the microprocessor 16 to provide information about the various parameters measured by the sensors 22. Of course, the sensors 22 may include additional sensors to measure other battery parameters, or may include fewer sensors, as desired. A timer 26 is connected to the microprocessor 16; the timer 26 facilitates measurement of a charge time. Thus, the amount of time the battery 20 is charged, or specific intervals therein, can be timed by the timer 26, and this information communicated to the microprocessor 16.

Figure 2:
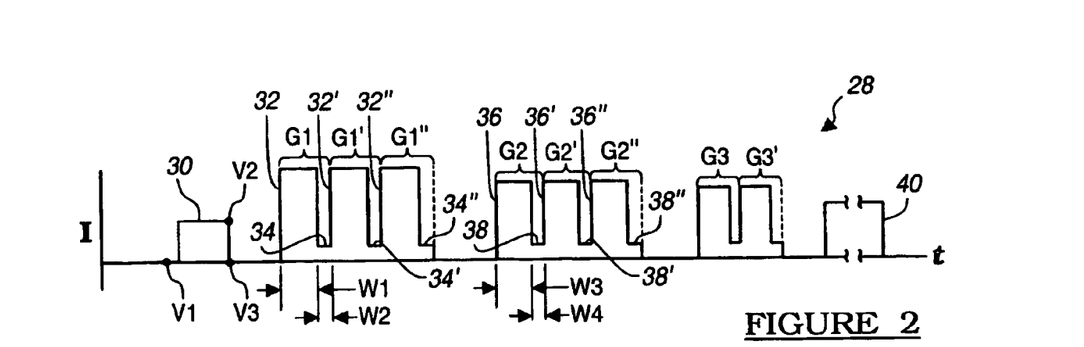
FIG. 2 shows a series of current pulses that can be used by the battery charger shown in FIG. 1.

As shown in FIG. 1, the microprocessor 16 is in communication with the control circuit 18, and each of them is capable of providing information to the other. For example, according to one method of charging a battery, such as the battery 20, the microprocessor 16 is configured to command the control circuit 18 to apply an excitation current pulse to the battery 20 to facilitate measurement by one of the sensors 22 of a voltage in response to the excitation current pulse. FIG. 2 illustrates a current wave form 28 that includes an excitation current pulse 30, as described above. The current pulse 30 has a relatively small amplitude, which is measured along the ordinate in FIG. 2. The ordinate in FIG. 2 is labeled with the letter "I", which represents an amount of current. The amplitude of the current pulse 30, or any of the other current pulses described hereafter, can be indicated by a number of amperes (amps), or can be indicated in terms of a C-rate. The C-rate of a battery is the charge and discharge current, which is related to the battery capacity, and which is measured in amp-hours (Ah). Thus, for a battery having a capacity of 10 Ah, a 0.1 C-rate, or 0.1 C, is equal to 1 A. Although the amplitude of the current pulse 30, shown in FIG. 2, may vary, it will often be within a range of 0.001C–0.5 C. This small current pulse serves a number of functions for the battery charger 10.

One purpose for applying an excitation current pulse, such as the current pulse 30, is to help determine a rated voltage for the battery being charged. For example, FIG. 2 shows three different points V1, V2 and V3, on or near the current pulse 30. These represent points at which one or more of the sensors 22 measures the voltage of the battery 20. An initial voltage measurement, such as at V1, can be useful to help determine the rated voltage of the battery. For example, if the battery is a lithium battery, of the type frequently used in video cameras, and the voltage measurement at V1 is 2.4V, the battery 20 could have a rated voltage of 3.6V, 7.2V, or some other voltage typical of a lithium video camera battery. Various voltage ratings for common battery sizes can be programmed into the microprocessor 16 in a parameter table. Such a parameter table allows the microprocessor 16 to make comparisons between measurements performed by the sensors 22 and known data values, such as the rated voltage of different batteries.

The current pulse 30 is applied for a relatively short time, which may be a few seconds or a few minutes, as desired. Before the current pulse 30 has ended, the voltage of the battery 20 is again measured, this time at V2. This measurement is a voltage response to the excitation pulse 30. Continuing with the example from above, if the voltage response (V2) is greater than 3.6V, the microprocessor assumes that the battery 20 has a rated voltage greater than 3.6V—e.g., a rated voltage of 7.2V. When the excitation current pulse 30 has ended, the voltage of the battery 20 is again measured by one of the sensors 22, this time, at V3. If the voltage measurement at V3 is almost equal to the initial voltage measurement at V1, the microprocessor 16 assumes that the battery 20 cannot accept additional charge. This could indicate a fully charged battery, or it could indicate that the battery is incapable of holding a charge. Thus, an excitation current pulse, such as the excitation current pulse 30, can be used to help determine the rated voltage of a battery being charged, as well as whether the battery is already charged or incapable of holding a charge.

Batteries having different chemistries—e.g., nickle-cadmium, lithium, lead acid—have associated with them a number of common voltage ratings. Thus, the use of an excitation current pulse, such as the excitation current pulse 30, can help determine the chemistry of the battery being charged. It is also contemplated that the battery charger 10 can have a number of different contacts that cooperate with terminals on various different battery types. Some examples include button-type batteries used in electronic devices, cylindrical batteries such as AAA–D cells, spring-top batteries, such as used in lantern flashlights, and automotive batteries. The battery charger 10 can be configured with different contacts to accommodate the differently configured terminals of different types of batteries. The microprocessor 16 can then use the response voltage in conjunction with information regarding the battery terminals to determine a specific battery type-i.e., the rated voltage of the battery, and the battery chemistry. Alternatively, a battery charger, such as the battery charger 10, may be configured to accept only certain types of batteries, or only batteries having a particular voltage rating.

After the excitation current pulse 30 has ended, the microprocessor 16 determines the parameters of a first positive current pulse 32. The current pulse 32 is defined by a first pulse amplitude and a first pulse width (W1), each of which is determined by the microprocessor 16. The first pulse amplitude is based on the measured voltage response to the excitation current pulse 30, and therefore, may vary depending on the type of battery. Alternatively, the first pulse amplitude can be based on a predetermined level. The use of a predetermined amplitude may be convenient when a battery charger, such as the battery charger 10, is designed to charge only one type of battery, or only batteries having the same rated voltage. The first current pulse can be a large current, perhaps as much as 10 C or more; however, it will often be in the range of 0.1 C–5 C.

The microprocessor 16 then commands the control circuit 18 to apply a second positive current pulse 34 to the battery 20. The current pulse 34 has an amplitude that is typically much less than the first current pulse 32. For example, although the amplitude of the current pulse 34 may go as high as 5 C or more, it may also go as low as 0.001 C or less. In fact, the second current pulse will often be in the range of 1 µA–1 C. In addition, the width (W2) of the current pulse 34 is also less than the width (W1) of the current pulse 32. Application of the second current pulse 34 helps to balance the battery charging. In the embodiment shown in FIG. 2, the microprocessor 16 commands the control circuit 18 to apply the first and second current pulses 32, 34 in such a way that the current applied to the battery 20 does not drop to zero between pulses.

The first and second current pulses 32, 34 define a first pulse group (G1). The microprocessor 16 commands the control circuit 18 to repeat application of the first pulse group (G1) until a first measured parameter exceeds a predetermined value. Additional applications of the first pulse group (G1), including first and second pulses 32, 34, are shown in FIG. 2 using the prime (') and double prime (") marks. The first measured parameter may include such things as a battery voltage, a charge time, or a battery temperature. For example, one or more of the sensors 22 can be used to monitor the temperature of the battery 20. The microprocessor 16 can be pre-programmed with a predetermined temperature such that the control circuit 18 will continue application of the first pulse group (G1) until the temperature of the battery 20 exceeds the predetermined temperature programmed into the microprocessor 16.

As an alternative, the microprocessor 16 can compare elapsed time provided by the timer 26 to a predetermined time programmed into the microprocessor 16, and can command the control circuit 18 to cease application of the first pulse group (G1) only after the elapsed time meets or exceeds the predetermined time. In one embodiment, the voltage of the battery 20 can be measured by one of the sensors 22 during and/or after the application of the second current pulse 34. The microprocessor 16 can then compare the measured voltage of the battery 20 to a predetermined voltage, and can command the control circuit 18 to cease application of the first pulse group (G1) after the measured battery voltage meets or exceeds the predetermined voltage.

After the first measured parameter exceeds the predetermined value, the microprocessor 16 commands the control circuit 18 to apply a third current pulse 36 and a fourth current pulse 38 to the battery 20. As shown in FIG. 2, the third current pulse 36 is defined by a third pulse amplitude and a third pulse width (W3). Similarly, the fourth current pulse 38 is defined by a fourth pulse amplitude and a fourth pulse width (W4). The third and fourth pulses 36, 38 define a second pulse group (G2). As with the first pulse group (G1), the microprocessor 16 commands the control circuit 18 to continue application of the second pulse group (G2), until a second measured parameter exceeds a predetermined value. The second measured parameter can be the same as the first measured parameter, or it may be a different parameter. In one embodiment, the second measured parameter is also a battery voltage. The predetermined value—i.e., voltage—it is compared to, can be the same as the predetermined voltage used with the first measured parameter, or it can be different. The first and second measured parameters can, of course, be compared to different predetermined values, if desired. As shown in FIG. 2, additional applications of the second pulse group (G2)—i.e., the third and fourth current pulses 36, 38—are indicated by the use of (') and (") marks.

The microprocessor 16 may command the control circuit 18 to apply additional pulse groups, such as a third pulse group (G3), as shown in FIG. 2. Each additional pulse group will be applied until a corresponding measured parameter exceeds a predetermined value. In addition, application of the pulse groups will continue until a predetermined condition is met. Some of the embodiments shown in the drawing figures have three different pulse groups; however, less than three, or more than three, pulse groups may be used to charge a battery. Similar to comparing the measured parameter to a predetermined value to end an individual pulse group, the predetermined condition defines when application of all pulse groups ceases. For example, the predetermined condition can be a battery charge time. In such situations, application of the pulse groups would cease after an elapsed time, as measured by the timer 26, met or exceeded a predetermined time programmed into the microprocessor 16. Alternatively, application of the pulse groups may stop when a total number of pulse groups meets a predetermined number of pulse groups programmed into the microprocessor 16. In one embodiment, the microprocessor 16 will command the control circuit 18 to cease application of the pulse groups when the battery voltage meets or exceeds a predetermined voltage. In another embodiment, the microprocessor 16 will command the control circuit 18 to cease application of the pulse groups when the battery temperature exceeds a predetermined temperature.

After the predetermined condition is met, and the microprocessor 16 commands the control circuit 18 to cease application of the pulse groups, a final, single current pulse 40 may optionally be applied to the battery 20. This can be useful, since the microprocessor 16 can be programmed such that the control circuit 18 will be commanded to cease application of the pulse groups before the battery 20 is completely charged. In one embodiment, a battery, such as the battery 20, will be more than 95% charged when the microprocessor 16 commands the control circuit 18 to cease application of the pulse groups. The final current pulse 40 can then be used to finish charging the battery 20 using a relatively small pulse amplitude, over what can be an extended period of time—i.e., using a "trickle" charge. For example, the final current pulse 40 may have an amplitude in the range of 0.001 C–0.5 C, though larger or smaller current pulses can be used. Similarly, the final current pulse 40 may have a width, or duration, of one or two hours, though it could be more or less, depending on how much additional charge is required.

The microprocessor 16 can be programmed to command the control circuit 18 to end the final current pulse 40 when a predetermined condition is met—e.g., when a measured battery voltage equals or exceeds a predetermined value. In order to indicate to a user that a battery, such as the battery 20, is fully charged, the battery charger 10 may contain a series of indicator lights. Although many different configurations are possible, including one or more flashing lights which eventually stop flashing when the battery is fully charged, the present invention contemplates the use of a series of lights, where each additional light indicates that the battery is more fully charged. For example, if the battery charger 10 is provided with five indicator lights, the first indicator light may be lit when the battery is first placed into the charger 10. Then, when the battery achieves 25% of a full charge, the second indicator light is lit. This would continue each time the battery receives an additional 25% of full charge, until the fifth light is lit after the final current pulse, such as the pulse 40 has ended.

Figure 3:
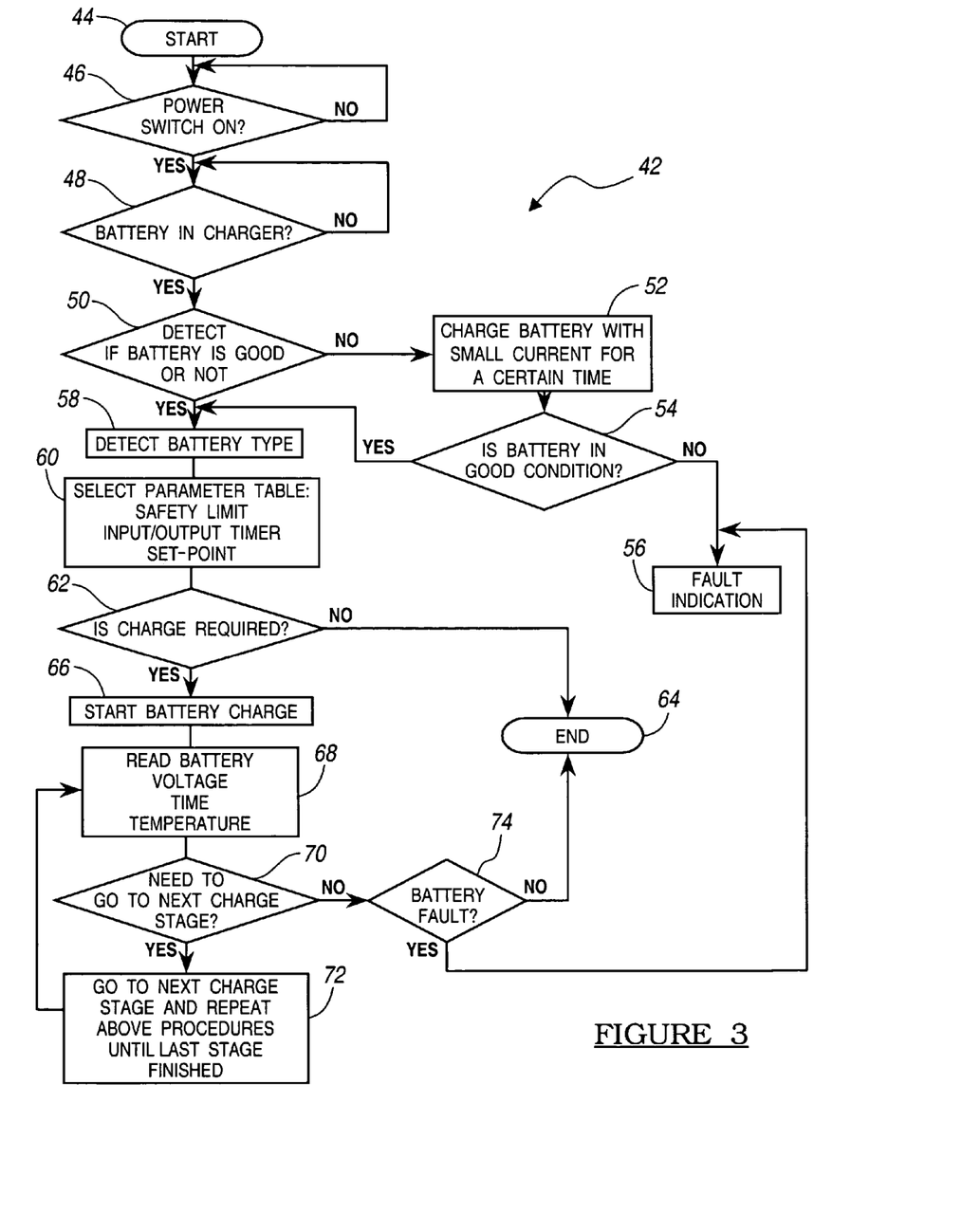
FIG. 3 shows a flow-chart illustrating a method of charging a battery in accordance with the present invention.

FIG. 3 shows a flow chart 42 that enumerates the steps of a charging method in accordance with the present invention. For reference, the battery charger 10 in FIG. 1 will be used. In the first step 44, the battery charging is started. This can occur automatically when the battery is placed in the charger 10. Alternatively, a manual power switch may be provided on the battery charger 10, such that in step 46, the microprocessor 16 determines whether the power switch is turned on. If it is not, the method loops back so that the microprocessor 16 can again check to see if the power switch is turned on. When the microprocessor 16 determines that the power switch is on, it then further determines whether a battery, such as the battery 20, has been placed in the charger 10—see step 48. If a battery has not been placed in the charger 10, the method loops back so that the microprocessor 16 can continue to check for a battery. When the microprocessor 16 determines that the power switch is on, and there is a battery in the charger, it then determines whether the battery is "good"—i.e., whether it is capable of holding a charge. This is shown in step 50.

To perform step 50, the microprocessor 16 uses a first voltage measurement, such as the voltage measurement (V1) shown in FIG. 2. If the microprocessor 16 is unable to determine whether the battery is capable of holding a charge, it will command the control circuit 18 to apply an excitation current pulse, such as the excitation current pulse 30 described in conjunction with FIG. 2—see step 52. At the end of the excitation current pulse, the voltage of the battery (V3) is again measured at step 54. If, based on the initial voltage measurements (V1), (V2), (V3), the microprocessor 16 determines that the battery is incapable of holding a charge, a fault is indicated, for example, by one or more of the indicator lights described above—see step 56.

When the microprocessor 16 determines that the battery is capable of holding a charge, it then detects the battery type—see step 58. As described above, detecting the battery type may involve a number of steps, including determining where on the battery charger 10 the battery terminals are applied, as well as the battery voltage in response to the excitation current pulse. Once the battery type is detected, the microprocessor 16 then selects a parameter table, many of which can be preprogrammed into the microprocessor 16. As shown in step 60, selection of the parameter table will provide a number of values to which the microprocessor 16 can compare actual measurements. For example, a safety limit, such as a maximum battery temperature may be associated with the particular battery type. One or more of the sensors 22 can then provide battery temperature information to the microprocessor 16, which it can compare to the maximum battery temperature. If the battery temperature exceeds the maximum battery temperature chosen for the particular battery type, the microprocessor 16 can command the control circuit 18 to temporarily cease application of current to the battery, reduce the amplitude of the current being applied, or it can shut down the battery charger 10 completely. In addition, the selected parameter table may include predetermined times which limit the application of individual pulse groups and/or limit the overall charging time. Set-points for parameters, such as battery voltages, can also be read from the parameter table, so the microprocessor 16 can appropriately command the control circuit 18 based on battery voltage measurements by the sensors 22.

At step 62, the microprocessor 16 then determines whether the battery needs to be charged. This can be easily determined, for example, by a comparison of a measured voltage with a predetermined set-point voltage read from the parameter table. If the microprocessor 16 determines that the battery does not need to be charged, the process ends at step 64. If, however, the microprocessor 16 determines that the battery does need to be charged, the charging pulses are started at step 66. The sensors 22 and the timer 26 provide inputs to the microprocessor 16 relating to the battery voltage, the elapsed time, and the battery temperature—see step 68. In step 70, the microprocessor 16 determines whether it should command the control circuit 18 to continue applying the same pulse group, or whether it should command it to apply a different pulse group. As described above, the microprocessor 16 will compare a measured parameter, such as the battery voltage, to a predetermined value, to determine when to change pulse groups.

When the microprocessor 16 determines that it is necessary to go to the next charge stage—i.e., it determines that the next pulse group needs to be applied—it loops back to again read the battery voltage, the time, and the temperature—see steps 72, 68. When, at step 70, the microprocessor 16 determines that the battery does not need to go to the next charge stage, it then determines whether there is a battery fault, which can be done by applying a final current pulse, such as the current pulse 40 shown in FIG. 2. If, at step 74, the microprocessor 16 determines that there is a battery fault, it returns to step 56 to signal a fault condition. If, however, there is no battery fault, the battery charging ends at step 64.

FIGS. 4–7 show a variety of different charging pulses that can be generated by a battery charger, such as the battery charger 10. For example, in FIG. 2, the battery charging current was allowed to drop to zero between each different pulse group—i.e., between the first and second pulse groups (G1), (G2), and between the second and third pulse groups (G2), (G3). It is worth noting, however, that in the embodiment shown in FIG. 2, the current did not drop to zero between applications of the same pulse group—i.e., between G1 and G1', G1' and G1", etc.

Figure 4:
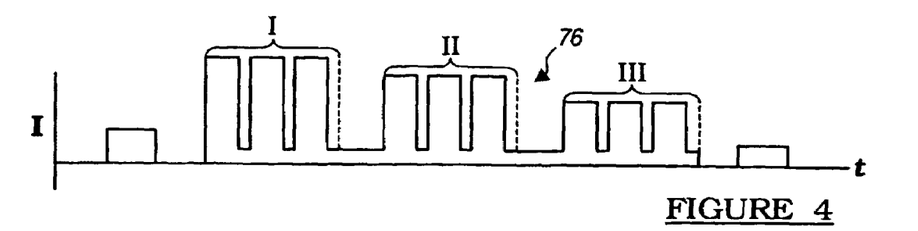
FIGS. 4–7 show different types of current pulses that can be used by the battery charger shown in FIG. 1 to charge a battery.

The current wave form 76, shown in FIG. 4, provides an alternative to this pattern. FIG. 4 shows three different pulse groups, designated generally by I, II, III, where each of the pulse groups I, II, III includes multiple applications of a single pulse group, similar to the embodiment shown in FIG. 2. In this configuration, a microprocessor, such as the microprocessor 16, commands the application of current to the battery being charged such that the current does not drop to zero between different pulse groups, but rather, maintains a small value between each different pulse group. This has been shown to provide an advantage in charging some batteries, in that it may speed up the charging time.

Figure 5:
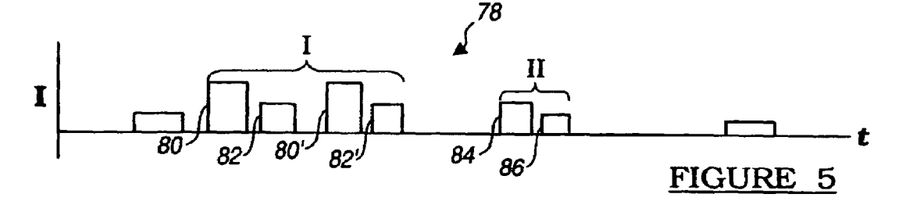

Another alternative current wave form 78 is shown in FIG. 5. In FIG. 5, first and second pulse groups are designated generally by I, II. The first pulse group I includes first and second current pulses 80, 82, and the second pulse group II includes third and fourth current pulses 84, 86. As shown in FIG. 5, the current applied to the battery is allowed to reach zero in between each of the pulse groups I, II. In addition, the charging current is also allowed to reach zero in between each of the individual current pulses, such as first and second current pulses 80, 82 and third and fourth current pulses 84, 86. Also as shown in FIG. 5, the amplitude and width of individual current pulses can vary between different pulse groups. In fact, the combination of current pulse amplitude and current pulse width can be varied to create pulse groups having a particular average current.

Figure 6:
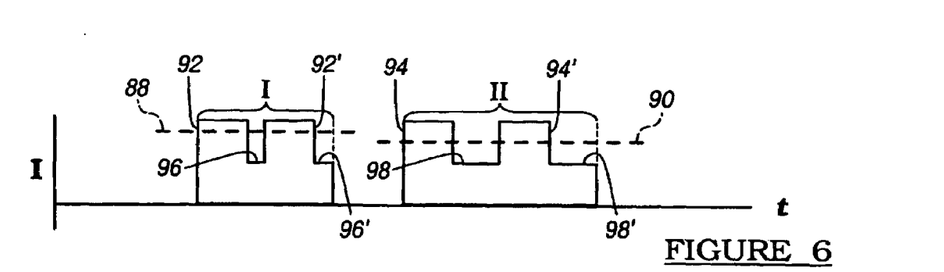
Figure 7:
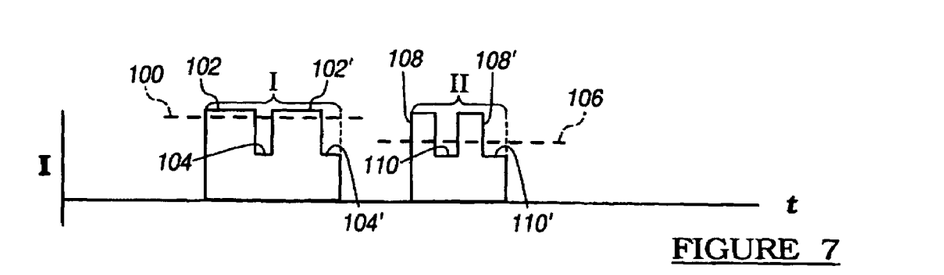

The variation and average current between pulse groups is best illustrated in FIGS. 6 and 7. For example, in FIG. 6, a first pulse group (I) has an average current indicated by the dashed line 88. A battery charger, such as the battery charger 10, can be configured to reduce the average current for each succeeding pulse group, by varying the amplitude or width of individual current pulses, or a combination thereof. The second pulse group (II) in FIG. 6 has an average current indicated by the dashed line 90 which is smaller than the average current 88. The reduction in average current is accomplished not by changing the amplitude of the current pulses from pulse group I to pulse group II, but rather, by changing the widths of certain current pulses. Specifically, a first current pulse 92 has the same amplitude and width as a third current pulse 94. In addition, a second current pulse 96 has the same amplitude as a fourth current pulse 98. The difference is that the fourth current pulse 98 has a larger width—i.e., it is applied for a longer duration—which decreases the average current.

Similarly, FIG. 7 shows two pulse groups I, II. The first pulse group (I) has an average current 100 defined by a first current pulse 102 and a second current pulse 104. The second pulse group (II) has an average current 106 smaller than the average current 100 of the first pulse group. The average current 106 is defined by a third current pulse 108 and a fourth current pulse 110. In this configuration, the amplitude and width of the second current pulse 104 are equal to the amplitude and width of the fourth current pulse 110. The difference in average currents is effected by a difference in the widths of the first and third current pulses 102, 108. A review of FIGS. 2 and 4–5 show that a reduction in average current can also be effected by reducing the amplitude of the current pulses in succeeding groups, rather than by adjusting the width of the pulses. By using reduced average currents in succeeding pulse groups, the battery charger 10 takes advantage of changes in battery charge acceptance to more quickly and efficiently charge a battery.

Figure 8:
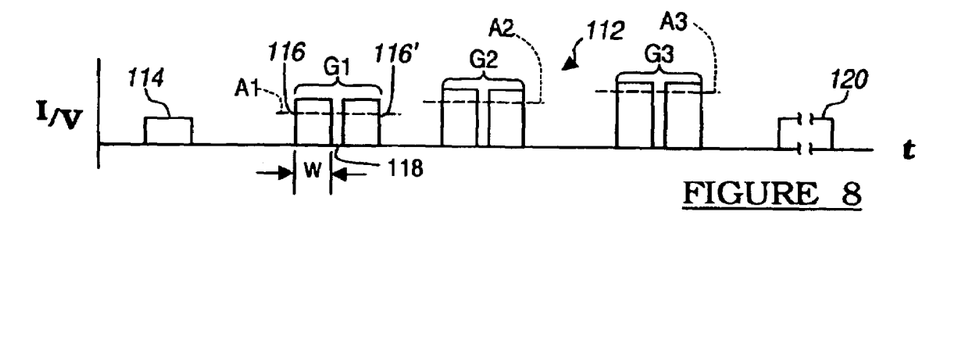
FIGS. 8–10 show different types of voltage pulses that can be used by the battery charger shown in FIG. 1 to charge a battery.
Figure 9:
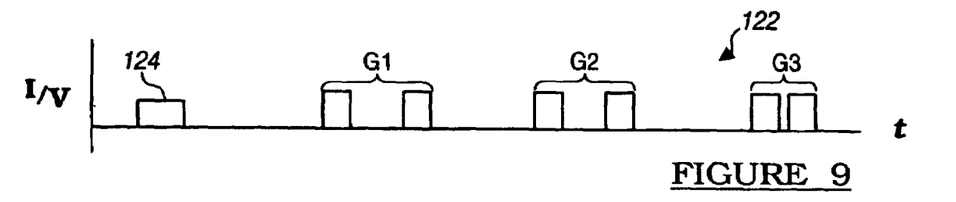
Figure 10:
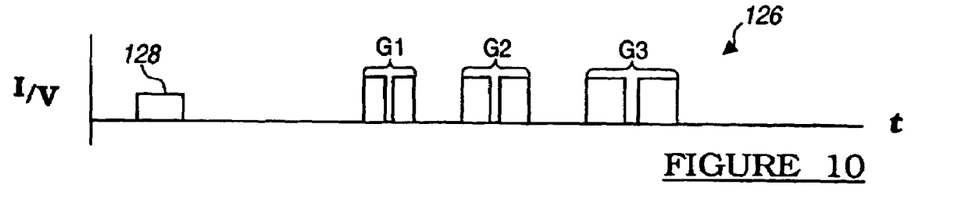

As discussed above, the controller 18 is capable of outputting voltage pulses to charge a battery, rather than current pulses. FIGS. 8–10 show different wave forms that a battery charger, such as the battery charger 10, can generate to charge a battery. For example, FIG. 8 shows a voltage charging sequence 112 that begins similarly to some of the current charging sequences described above. Before charging pulses are applied to the battery, a single excitation current pulse 114 is applied. The purpose of the excitation current pulse is as described above—i.e., it can be used to help determine a battery type, and whether the battery is ready to accept a charge.

After the excitation current pulse 114 is applied, a first voltage pulse 116 is applied. The first voltage pulse has a width (W) and an amplitude, shown along the ordinate in FIG. 8, larger than the open circuit voltage of the battery being charged. This helps to ensure that application of the voltage pulse will not cause voltage to flow from the battery back into the charger. After the first voltage pulse 116 is applied, a rest period 118 is provided. During the rest period 118, no voltage is applied to the battery; however, a small voltage could be applied if desired. After the rest period 118, the first voltage pulse is again applied, and this is designated by 116'.

Although only two applications of the first voltage pulse 116, 116' are shown in FIG. 8, it is contemplated that first voltage pulses, separated by corresponding rest periods, will be applied, thereby forming a first voltage pulse group (G1). Application of the first voltage pulses will continue until a predetermined condition is met. The predetermined condition can include one of, a combination of, comparisons between measured parameters and predetermined values. For example, the battery voltage can be measured during each rest period, and if the measured voltage exceeds a predetermined voltage, application of the first voltage pulses can be ended. Similarly, a battery current can be measured while the first voltage pulses are applied. If the measured battery current drops below a predetermined level, application of the first voltage pulses can be ended. Another predetermined condition that can be used is the battery temperature, which can be measured during the application of the first voltage pulses, and during the rest periods.

After the predetermined condition is met, and application of the voltage pulse group is ended, additional voltage pulses may be applied. In FIG. 8, two more voltage pulse groups (G2), (G3) are applied. As with the current pulse charging method, any number of different pulse groups may be used. As shown in FIG. 8, each succeeding voltage pulse group has an average voltage greater then the average voltage of the proceeding groups (A1, (A2, A3). This is in contrast to the current pulse groups, which had lower average current values for each succeeding group.

As with application of the current pulse groups, application of the voltage pulse groups will continue until some predetermined condition is met. For example, application of the voltage pulse groups may continue until a measured battery voltage exceeds a predetermined voltage, until a battery charge time meets or exceeds a predetermined battery charge time, until a predetermined number of voltage pulse groups is applied, or until a measured current is less than a predetermined current. After application of the voltage pulse groups is ended, a single, positive current pulse, such as the current pulse 120 may be optionally applied to further charge the battery with a trickle charge.

In order to increase the average voltage of succeeding voltage groups, the voltage pulses in FIG. 8 increase in amplitude. FIGS. 9 and 10 show alternative methods of increasing the average voltage of succeeding voltage pulse groups. For example, in FIG. 9, a voltage charging sequence 122 is shown. Before application of the voltage pulses, an excitation current pulse 124 is applied. Then, the voltage pulses are applied in three groups (G1), (G2), (G3). As shown in FIG. 9, each of the voltage pulses in each of the three groups (G1), (G2), (G3) has the same amplitude; however, the rest periods between each voltage pulse decrease for each succeeding voltage pulse group.

Similarly, FIG. 10 shows a voltage charging sequence 126. At the outset, an excitation current pulse 128 is applied. Then three voltage pulse groups (G1), (G2), (G3) are applied. As shown in FIG. 10, each succeeding voltage pulse group has a higher average voltage than a preceding voltage pulse group. In the embodiment shown in FIG. 10, the increase in average voltage is effected by increasing the width, or duration, of succeeding voltage pulses. Thus, even though the voltage pulse amplitudes, and the rest periods between pulses, are constant, the average voltage increases for each succeeding pulse group.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for charging a battery, comprising:
    applying a first positive current pulse to the battery, the first current pulse being defined by a first pulse amplitude and a first pulse width;
    applying a second positive current pulse to the battery after applying the first current pulse, the second current pulse being applied such that the current applied to the battery does not reach zero between the first and second current pulses, the second current pulse being defined by a second pulse amplitude and a second pulse width, the second pulse amplitude being smaller than the first pulse amplitude, the first and second current pulses defining a first pulse group;
    repeating application of the first pulse group until a first measured parameter exceeds a predetermined value;
    applying a third positive current pulse to the battery, the third current pulse being defined by a third pulse amplitude and a third pulse width;
    applying a fourth positive current pulse to the battery after applying the third current pulse, the fourth current pulse being applied such that the current applied to the battery does not reach zero between the third and fourth current pulses, the fourth current pulse being defined by a fourth pulse amplitude and a fourth pulse width, the fourth pulse amplitude being smaller than the third pulse amplitude, the third and fourth pulses defining a second pulse group; and
    repeating application of the second pulse group until a second measured parameter exceeds a predetermined value; wherein the first and second current pulses define a first average current, and the third and fourth current pulses define a second average current smaller than the first average current, and further comprising applying additional current pulses to the battery, thereby defining at least one additional pulse group, the at least one additional pulse group including a pair of positive current pulses, the additional current pulses being applied until a predetermined condition is met.

2. The method of claim 1, wherein the first measured parameter is one of a battery voltage, a charge time, or a battery temperature, and the second measured parameter is one of a battery voltage, a charge time, or a battery temperature.

3. The method of claim 1, further comprising determining a battery type for the battery prior to applying the first current pulse, and wherein the first pulse amplitude corresponds to the battery type.

4. The method of claim 1, wherein the first current pulse has an amplitude in the range of 0.1 C–5 C, and the second current pulse has an amplitude in the range of 1μA–1 C, where C is a discharge current for the battery.

5. The method of claim 1, wherein the second current pulse is approximately equal to the fourth current pulse, the third pulse width is approximately equal to the first pulse width, and the third pulse amplitude is less than the first pulse amplitude, thereby defining a second average current smaller than the first average current.

6. The method of claim 1, wherein the first current pulse is approximately equal to the third current pulse, the fourth pulse amplitude is approximately equal to the second pulse amplitude, and the fourth pulse width is greater than the second pulse width, thereby defining a second average current smaller than the first average current.

7. The method of claim 1, wherein the second current pulse is approximately equal to the fourth current pulse, the first pulse amplitude is approximately equal to the third pulse amplitude, and the third pulse width is smaller than the first pulse width, thereby defining a second average current smaller than the first average current.

8. The method of claim 1, wherein the predetermined condition is a battery voltage, a battery charge time, a battery temperature, or a total number of pulse groups.

9. The method of claim 1, wherein each of the at least one additional pulse group defines a respective average current smaller than the average current of a preceding pulse group.

10. The method of claim 1, further comprising applying zero current to the battery for a predetermined amount of time in between each pulse group.

11. The method of claim 1, further comprising applying a positive current pulse to the battery for a predetermined amount of time in between each pulse group.

12. The method of claim 1, further comprising applying a single positive current pulse to the battery after the predetermined condition is met, thereby providing additional charge to the battery.

13. The method of claim 1, wherein application of each succeeding current pulse within each of the pulse groups immediately follows a respective preceding current pulse, such that the current applied to the battery does not reach zero between adjacent current pulses.

14. A method for charging a battery, the method comprising:
    applying an excitation current pulse to the battery;
    measuring a voltage response of the battery after applying the excitation current pulse;

applying a first positive current pulse to the battery, the first current pulse being defined by a first pulse amplitude and a first pulse width, the first pulse amplitude being based on the measured voltage response or a predetermined value;

applying a second positive current pulse to the battery after applying the first current pulse, the second current pulse being defined by a second pulse amplitude and a second pulse width, the second pulse amplitude being smaller than the first pulse amplitude; and repeating application of the first and second positive current pulses until a measured parameter exceeds a predetermined value;

applying a third positive current pulse to the battery, the third current pulse being defined by a third pulse amplitude and a third pulse width;

applying a fourth positive current pulse to the battery after applying the third current pulse, the fourth current pulse being defined by a fourth pulse amplitude and a fourth pulse width, the fourth pulse amplitude being smaller than the third pulse amplitude; and repeating application of the third and fourth positive current pulses until a measured parameter exceeds a predetermined value;

wherein application of the first and second current pulses to the battery defines a first pulse group, and application of the third and fourth current pulses defined a second pulse group, the method further comprising applying additional current pulses to the battery, thereby defining at least one additional pulse group including a pair of positive current pulses, the additional current pulses being applied until a predetermined condition is met;

wherein the predetermined condition is a battery voltage, a battery charge time, a battery temperature, or a total number of pulse groups; and wherein application of each succeeding current pulse within each of the pulse groups immediately follows a respective preceding current pulse, such that the current applied to the battery does not reach zero between adjacent current pulses.

* * * * *